May 11, 1965 E. P. LA KAFF 3,182,846
CABINET STRUCTURE
Filed April 11, 1961 2 Sheets-Sheet 1
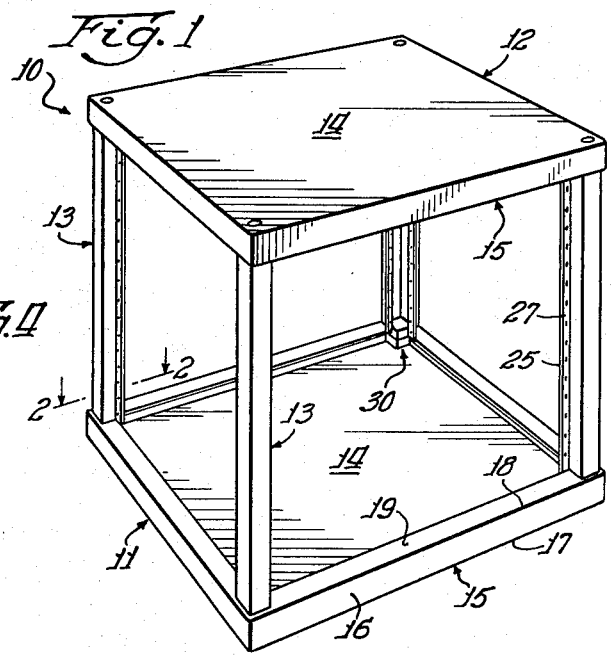
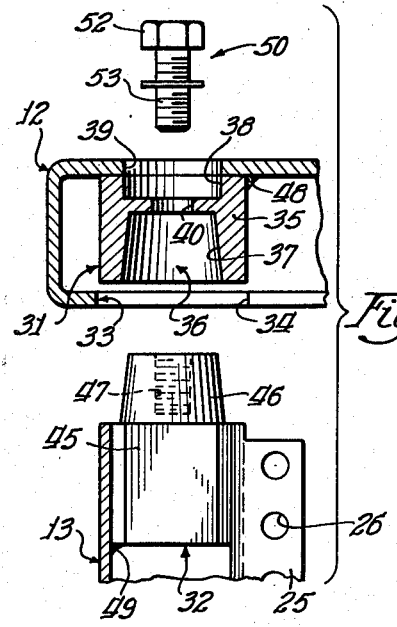
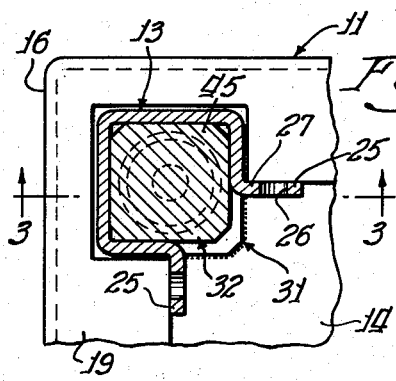
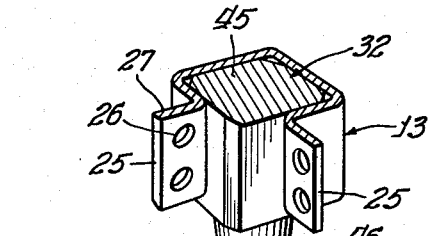
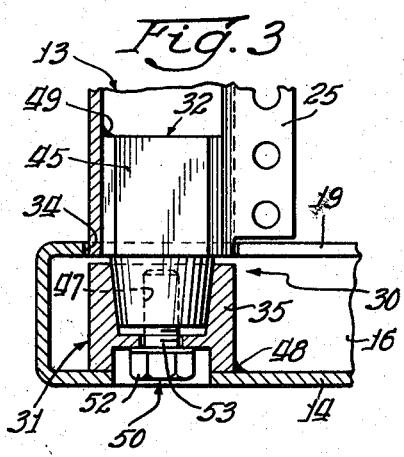
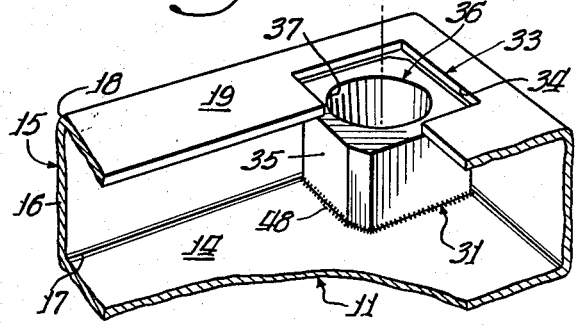
Inventor:
Edward P. LaKaff
By: Joseph W. Malleck Atty.

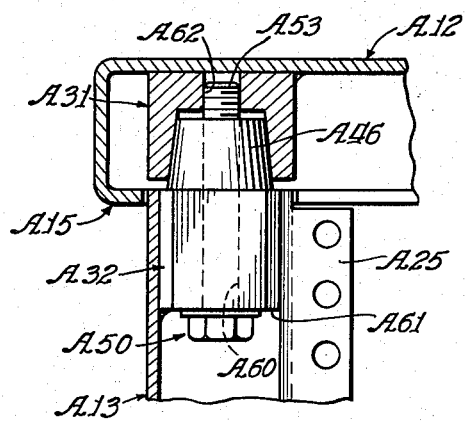
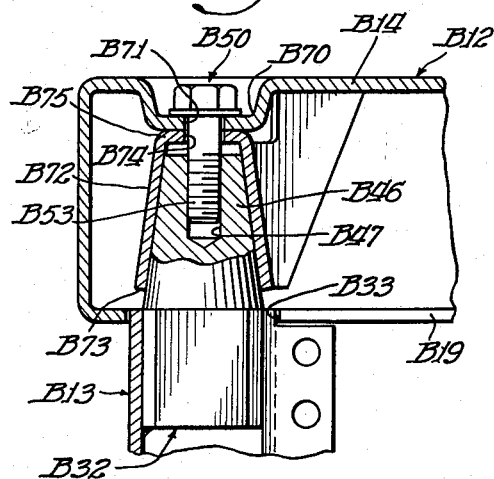
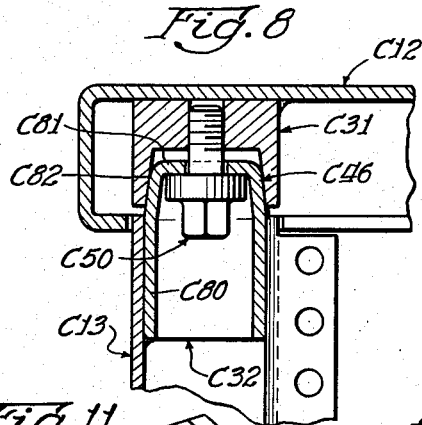
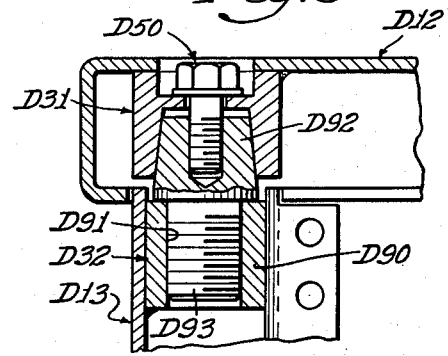
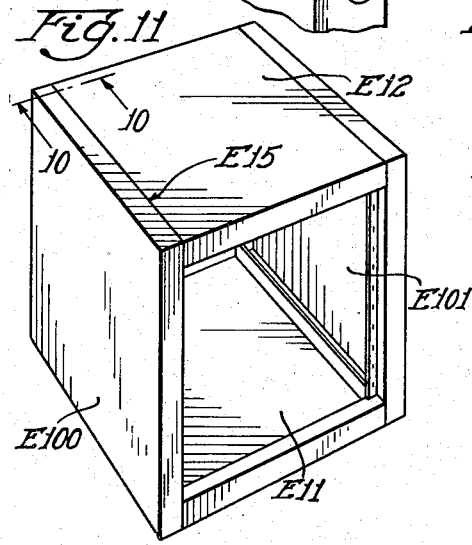
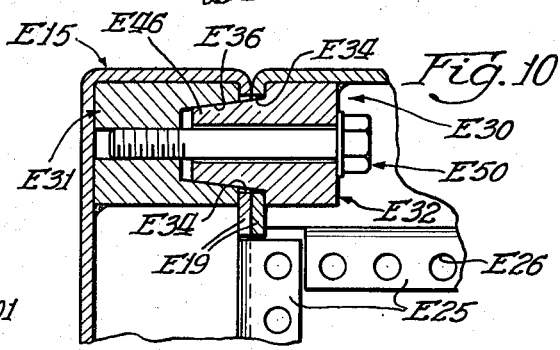

United States Patent Office 3,182,846
Patented May 11, 1965

3,182,846
CABINET STRUCTURE
Edward P. La Kaff, Mount Prospect, Ill., assignor to Borg-Warner Corporation, Chicago, Ill., a corporation of Illinois
Filed Apr. 11, 1961, Ser. No. 102,274
7 Claims. (Cl. 220—4)

This invention relates to cabinet structures and more particularly to an easy-assemble cabinet structure adapted for receiving equipment, such as electronic devices and the like in which the elements of the structure carry simplified interconnecting means which enable the ultimate user to accurately assemble such elements without the need of special tools other than a simple wrench.

The use of functionally designed cabinetry for enclosing various types and sizes of equipment, such as medical, computing, transmission, supervisory data, radio, television or other electrical or control equipment, has become more prevalent. However, installations of equipment of these general types differ widely and, heretofore, it has often been the practice to enclose such installations in cabinets custom built in accordance with the particular installation and permanently assembled at the manufacturing plant. Such cabinets cannot be mass produced and are relatively expensive not only because of their singular purpose, but because of storage and shipping problems encountered when structures are permanently assembled at the manufacturing plant as by welding and other means. Even in the case of cabinets constructed in accordance with the modular system, disclosed in U.S. Patent No. 2,822,231, February 4, 1958, in which basic units can be combined to form a desired cabinet configuration, the problems of storage and shipping costs still exist.

To obviate the above problems opposing objects must be accomomodated. First, the elements of the cabinet must be equipped with interconnecting means capable of being manufactured economically while permitting later simplified manual assembly. Secondly, interconnecting the means must not be too simplified in nature so that a rigid structure equal to a welded construction is not achieved and so that human error is eliminated in fitting the elements together.

It is, therefore, a primary object of this invention to provide a new and improved cabinet structure which may be produced relatively economically and which may be easily adapted to the requirements of various equipment installations.

Another object of the present invention is to provide a cabinet structure having elements equipped with a novel interconnecting means which enable the elements to be shipped unassembled to the ultimate unsophisticated user and thereafter easily assembled by such user into a rigidly formed cabinet without need of special tools other than a simple wrench such as of the socket type.

Another object of this invention is to provide a cabinet construction having elements for forming a super structure and which elements are equipped with interconnecting means adapted to insure perfect alignment of said elements upon assemblage by a layman without need of special or other tools.

Still anohter object of this invention is to provide a cabinet construction comprised of basic elements which permit a substantial amount of interchangeability of parts for greater versatility.

Yet another object of this invention is to provide an economical cabinet construction having constituent elements adapted for assemblage by the ultimate user and having simplified interconnecting means which frictionally lock said elements in position upon interengagement thereof.

Other objects and advantages of the present invention will become apparent from the following description and accompanying drawings, wherein:

FIG. 1 is a perspective view of a cabinet structure and embodying the features of this invention;

FIG. 2 is an enlarged fragmentary sectional view taken substantially along line 2—2 of FIG. 1;

FIG. 3 is a sectional view taken substantially along line 3—3 of FIG. 2;

FIG. 4 is an enlarged exploded view partly in section of one corner of said cabinet structure;

FIG. 5 is an enlarged fragmentary and perspective view of one corner of said cabinet structure illustrating separated members of the interconnecting means in position to be engaged;

FIGS. 6–10 are fragmentary sectional views similar to FIG. 3 and each illustrating separate modified forms of this invention; and FIG. 11 is a perspective view of a cabinet structure incorporating the modification of FIG. 10 in which there are no supporting legs or posts.

Referring more specifically to the drawings wherein like parts are designated by the same numerals throughout the various figures, a cabinet structure or super-structure 10 embodying the features of this invention is shown in FIG. 1 and comprises a base or first frame member 11 and a top or second frame member 12 spaced apart and interconnected by a plurality of struts 13. The base and top frame members 11 and 12 each have a substantial flat portion 14 circumscribed by a flange means or skirt 15, each skirt 15 comprising an elongated wall 16 having one longitudinal edge 17 integrally connected with said flat portion 14 and extending generally normally thereto. The other longitudinal edge 18 of the skirt wall 16 has an integral elongated flange 19 extending laterally inwardly of the structure and spaced from said flat portion 14. The base and top frame members may be preferably formed from sheets of plate-steel whereby the skirts 15 are stamped as integral L-shaped channels from the margins of the sheets. As shown in FIG. 1, the skirt of the base frame member is facing upwardly and the skirt of the top frame member is facing downwardly to provide a smooth and well designed exterior for the cabinet construction.

Each strut 13 has a generally elongated configuration and may be considered a post or leg of the cabinet super structure. The struts are here shown, in FIGS. 1–5, as being preferably formed from strips of plate steel and contoured so that the struts have a generally rectangular cross-section with the longitudinal margins of said strip being turned outwardly to form longitudinally extending flanges 25 with the lateral extent of each flange 25 being at right angles to the other. Each of said strut flanges are provided with a plurality of aligned mounting openings or apertures 26 and mounting surfaces 27 so that panels or equipment (not shown) may be secured to the super-structure to complete the cabinet construction.

To enable the unsophisticated user to assemble these component parts with the utmost ease and assurance an interconnecting means 30, having self-aligning features, comprises engaging elements 31 secured to the base and top frame members and engaging elements 32 secured to opposite ends of the struts 13. The engaging elements 31 of the base and top frame members are preferably formed as generally rectangular aluminum blocks attached, as by welding 48, to the flat portion 14 thereof and located subjacent the flange 19 of the frame member skirts 15. A plurality of guide openings 33 are provided in the skirt flange 19 having sides or edges 34 in substantially vertical alignment with the sides 35 of the engaging elements 31 as seen in FIG. 2; the openings 33 are located in the corners of the skirt means so that oining flanges 19 do not have their respective terminating edges 20 meeting.

Each of the engaging elements 31 are provided with a male socket portion 36 comprising a frustro-conical cavity 37 facing outwardly toward its aligned guide opening in skirt flange 19. The outer end side of the engagements 31 are provided with a central recess 38 (FIG. is alignment with one of a plurality of openings 39 provided in the flat portion of the base or top frame member. A passage 40 is provided in the elements to communicate the recess 38 with the cavity 37 for receiving fastening means to be described hereinafter.

The engaging elements 32 secured to each end of the struts comprise a primary part 45 shaped preferably as a solid aluminum block and having a solid second part male portion 46 integrally formed thereto extending longitudinally outwardly of the struts ends. The primary parts fit snugly within the inner contours of the struts and are secured thereto preferably by welding 49. The male portion 46 has a frustro-conical configuration adapted to snugly fit within the female socket portion 36 of the engaging elements 31. As shown in dotted outline in FIGS. 2–4, each male portion is provided with a central threaded bore 47 extending partially into the interior thereof for purposes to be described.

In accordance with this invention the frame members, struts and other panels may be shipped to the used in the assembled condition, requiring only inter-engagement means 30 for accurately relating the elements of the structure. More particularly, the male portions 46 of engaging elements 32 are adapted to be fitted into the female socket portions 36 of the elements 31 for assembling the struts with the top and base frame members. In doing so, each male portion is automatically guided into predetermined alignment with the female socket portion by virtue of the tapered mating surfaces. In addition to the self-alignment of the male and female portions, two other self-aligning means are provided. First, certain of the mounting surfaces 27 of strut flanges 25 are adapted to engage the terminating edge 20 of the skirt flange 19 upon interengagement means 30.

The disposition of two flanges on each strut at right angles to each other provide a highly accurate means for aiding in properly relating the struts to the frame members.

Secondly, the sides or edges 34 of the guide openings provided in the skirt flange 19 are adapted to engage the outer lateral periphery of each strut when the means is interengaged. As shown in FIGS. 3–5, the sides 34 of the guide openings are slightly spaced from the engaging elements 31 to provide greater facility and stability of positioning.

The engaging elements 31 and 32 are rigidly fastened together in the self-aligned and mated position by fastening means 50 comprising bolts having a head portion 52 abutting the walls of recess 38 in element 31 and having a threaded shank 53 for threadably engaging bore in element 32. It can be readily seen that securing the fastening means in place requires no special assembly tools other than a conventional socket wrench. The base and top frame members are provided with a smooth outer contour and appearance since the fasteners 50 are recessed below the exterior surface thereof.

The struts are locked against turning also by virtue of the abutment of the sides 34 of the guide openings 33 against the outer periphery of the strut, by the abutment the strut flanges 25 against the terminating edge 20 the skirt flange 19, and by the superior frictional lock provided by engagement of the tapered aluminum surfaces of the male and female portions.

A slightly modified version of the preferred embodiment is illustrated in FIG. 6, in which similar parts have similar part numbers prefixed by the letter "A." The engaging elements A32 are each provided with a passage A60 adapted to permit the fasteners A50 to extend entirely therethrough from the innermost surface A61 of the elements A32. The engaging elements A31 are each provided with a threaded bore A62 adapted to threadably receive the shank A53 of the fasteners. It can be readily seen that the elements A32 have no recess or opening facing the exterior of the structure nor is there need for openings in the frame member A12. The fasteners A50 are inserted from the interior of the structure and thereby provide for an uninterrupted surface exterior for the cabinet construction. The frame members and struts are related one to the other in a manner similar to that described in connection with the preferred embodiment.

In FIG. 7, another alternative embodiment is illustrated, in which similar parts have similar part numbers prefixed by the letter "B." The flat portion B14 of frame member B12 has a plurality of recessed areas B70 each with a central aperture B71 generally in alignment with the center of one guide opening B33 provided in the skirt flange B19. A cup member B72 is attached at its closed end B75, as by welding, to the inner extent of each recessed area B70 and has a mouth B73 facing the guide openings B33. The closed end B75 of the cup member B72 has a central opening B74 in alignment with the central aperture B71 of the recessed areas and together form a passage for the fastener shank B53. The inner surface of each cup member is tapered to provide a frustro-conical configuration adapted to snugly receive the male portion B46 of the engaging element B32 mounted on strut B13. The struts are mated to the top frame member in substantially the same fashion by further structure similar to that described in the preferred embodiment.

In FIG. 8, still another alternative embodiment is illustrated, in which the engaging element C32 attached to the strut C13 and carrying the male portion C46, comprises a hollow generally cylindrical body C80 closed at one end C81. The portion C82 of the cylindrical body adjacent the closed end is tapered to form a frustro-conical engaging surface. The hollowness of the male portion C46 enables shorter and more economical bolts to be utilized. The engaging element C31 is constructed in substantially similar manner to that as shown in FIG. 6.

Yet another embodiment is illustrated in FIG. 9 wherein similar parts are prefixed by the letter "D." The engaging element D32 is comprised of two parts, a primary part D90 comprising a block fixed to the strut D13 and having a cylindrical threaded bore B91 therein and extending entirely therethrough. The secondary part D92 has a threaded extension D93 adapted to be threadably received in the bore D91 of the primary part so as to enable the engaging element B32 to be adjustable in length. The other parts of this embodiment are similar to that described in connection with the preferred embodiment.

In each of the embodiments, the mating male and female portions are formed of a metal material having a high coefficient of friction, such as aluminum. This selection of materials aid in locking the interconnecting means in place.

FIGS. 10 and 11 illustrate yet another alternative embodiment in which the structure completely obviates the need for supporting legs or struts while maintaining ease of assembly and rigidity of construction. The structure, in FIG. 11, has flat top and bottom frame members or panels E12 and E11, and opposite flat side frame members or panels E100 and E101. Each frame member has edge portions provided with a circumscribing flange or skirt means E15 constructed in accordance with the preferred embodiment. The panels are preferably arranged to form a rectangular configuration having two opposite sides of a panel each in engagement with a side of a different adjacent panel; opposite flanges E19 of each panel have guide surfaces in flush abutment with guide surfaces of flange E19 of the adjacent panel.

In this construction, the abutting flanges may be provided with a plurality of guide openings or apertures E34 located anywhere along the extent of such flanges, here preferably located at corners of the cabinet. The terminating edge of the flanges E19 which are not arranged in abutment with mating flanges, carry a supporting flange E25 extending inwardly perpendicular to the plane of the panel of which it is a part. Each supporting flange E25 has a plurality of mounting apertures E26 adapted to receive fasteners for securing other panels thereto (not shown).

The interconnecting means E30 is like that of the preferred embodiment in which engaging element E31 mounted on one of the panels has a female socket portion E36 adapted to align and lock with a male portion E46 on engaging element E32 mounted on another panel. The elements are held together by fastening means E50 extending centrally therethrough.

While a preferred and certain alternative embodiment of this invention are shown and described herein, it is obvious that many structural details may be changed without departing from the spirit and scope of the appended claims.

I claim:

1. An easy-assemble cabinet construction, comprising the combination: a first elongated frame member having a transverse section provided with at least one exterior side which is rectilinear in configuration, said first frame member having means defining a frusto-conical surface extending outwardly from one end of said first frame member and having the axis thereof generally parallel to the elongate extent of said first frame member, said frusto-conical surface having a diameter equal to or less than any width of said transverse section, a second frame member carrying means defining a frusto-conical surface effective to snugly receive and mate with the frusto-conical surface of said first frame member, said second frame member also having an opening defined by walls complementary in configuration to the transverse section of said first frame member, said frusto-conical surfaces and said walls of said second frame member being aligned and spaced apart so that said frusto-conical surfaces of both frame members may be mated to accurately centralize said frame members with respect to each other while permitting said walls to mate with the exterior side of said first frame member locking said frame members against twisting relative to each other; and fastening means directly interconnecting each of said frame members effective to maintain said mated surfaces in engagement.

2. An easy-assemble cabinet construction as in claim 1 in which each of said frame members are comprised of sheet metal and carry unitary blocks secured to the interior of said sheet metal frames, said blocks having defined thereon said frusto-conical mating surfaces.

3. An easy-assemble cabinet construction as in claim 1, in which each of said frame members is constructed of sheet metal, said second frame member having fla means extending outwardly herefrom and carrying opening defining walls and a terminal edge portion, first frame member comprising a lip effective to eng said terminal edge portion of said flange means w said frusto-conical surfaces and rectilinear surfaces inter-engaged.

4. An easy-assemble cabinet structure as in clain in which said first frame member comprises a male ment extending coaxially outwardly from one end said first frame member and carrying said frusto-con surfaces thereon, said second frame member compri a female socket element provided with said mating fru conical surface, and said fastening means comprising element threadably received centrally through both male and female elements.

5. An easy-assembly cabinet construction as in cl 4, in which said male element comprises a hollow sl metal cup provided with a closed end portion, said clc end portion being spaced from said first frame mem 6. An easy-assemble cabinet construction as in cl 4, in which said female socket element is comprised a sheet metal cup having a closed end portion enga with said second frame member and secured thereto.

7. An easy-assembly cabinet construction as in cl 1, in which said construction comprises a plurality of frame members effective to interconnect with a plura of second frame members, said first frame members be comprised of sheet metal defining a discontinuous ge erally rectangular cross-section terminating in porti and having elongated lips extending transversely outwa from the terminal portions of said first frame memb said second frame members being comprised of sl metal and having a generally flat base provided wit sheet metal skirt extending circumferentially about flat base, said skirt carrying said walls defining said of ings for receiving each of said first frame members having terminal edge portions intersecting with said of ing in a manner to coincide with the discontinuity of first frame members whereby said lips may engage terminal edge portion upon the interengagement of frusto-conical surfaces and said rectilinear surfaces.

References Cited by the Examiner
UNITED STATES PATENTS

| 936,451 | 10/09 | Havenhill. | |
| 1,558,612 | 10/25 | Hohorst | 108— |
| 1,675,827 | 7/28 | Shrader | 108— |
| 2,096,942 | 10/37 | Suters | 312— |
| 2,379,349 | 6/45 | Grinde | 20— |

FOREIGN PATENTS 653,689   5/51   Great Britain.

THERON E. CONDON, *Primary Examiner.*

FRANKLIN T. GARRETT, EARL J. DRUMMOND, *Examiner*